(No Model.)
J. A. CROCKER.
Filter.
No. 236,307.    Patented Jan. 4, 1881.
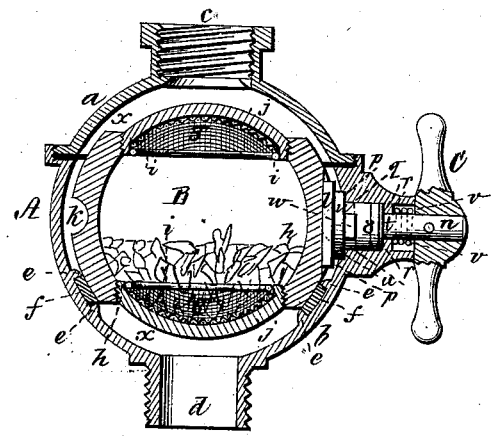
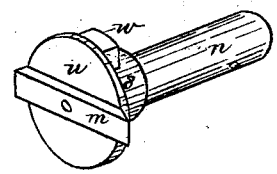
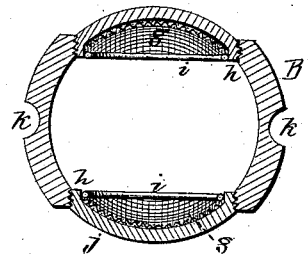
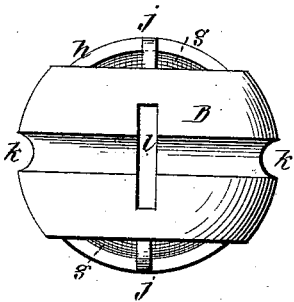
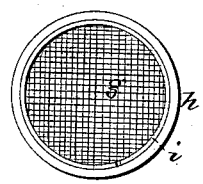
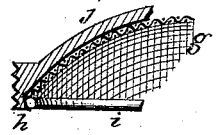
Attest:
F. H. Schott
Arthur Frazier
Inventor:
James A. Crocker,
per Norman W. Stearns,
His Attorney.

UNITED STATES PATENT OFFICE.

JAMES A. CROCKER, OF BOSTON, MASSACHUSETTS, ASSIGNOR TO THE CROCKER FILTER COMPANY, OF SAME PLACE.

FILTER.

SPECIFICATION forming part of Letters Patent No. 236,307, dated January 4, 1881.

Application filed October 26, 1880. (No model.)

*To all whom it may concern:*

Be it known that I, JAMES A. CROCKER, of Boston, county of Suffolk, and State of Massachusetts, have invented certain Improvements in Filters, of which the following is a full, clear, and exact description, reference being had to the accompanying drawings, making part of this specification, in which—

Figure 1 is a vertical section through the center of a filter constructed in accordance with my invention. Fig. 2 is also a central vertical section through the same, the position of the parts being changed. Fig. 3 is an elevation of the receptacle for containing the filtering material, said receptacle being removed from its outer casing. Figs. 4 and 5 represent one of the devices by which the strainer of wire-netting is supported and held in place. Fig. 6 is a perspective view of the stem by which the filtering-receptacle is reversed or turned.

My present invention relates particularly to certain improvements in filters for domestic and other uses for which I obtained Letters Patent of the United States No. 229,384; and this invention consists in a filtering-receptacle having its exterior surface provided with a groove or flattened portion extending preferably around it, said construction affording a free passage for the water through the chamber between it and the outer casing without passing through the filtering-receptacle when the filtration is not desired.

My invention also consists in a support for the strainer, which is held in place therein by a circular spring-wire, instead of being soldered thereto, said support being provided with a series of arms, against which the strainer rests, and by which it is prevented from being worn so rapidly as would be the case if unsupported, said arms also serving to divide the stream and overcoming the liability of its boring through the filtering-receptacle, each support being screwed in place therein and being capable of instant removal therefrom simultaneously with its strainer.

My invention also consists in an automatic packing for sealing at all times the connection or joint between the outer casing and the stem of the filter-handle passing through it, and by which the filter is reversed.

To enable others skilled in the art to understand and use my invention, I will proceed to describe the manner in which I have carried it out.

In the said drawings, A represents an outer casing, composed of two portions, $a$ $b$, which, when screwed together, approximate in form to that of a sphere, the upper portion, $a$, being provided with an inlet-opening, $c$, and an interior screw-thread, by which it may be united with the stop-cock of a supply-pipe, (not shown,) and the lower portion, $b$, having a discharge-orifice, $d$, a short distance above which, within the interior of the casing A, are formed two annular projections, $e$, in the space between which is located a packing constituting a seat, $f$, for the case or receptacle B, containing charcoal or other suitable filtering material, which is kept in place therein by two strainers or diaphragms, $g$, of wire-netting, secured within a circular support, $h$, by means of an annular wire spring, $i$, the support having four arms, $j$, for the strainer to rest on, which thus reduces its wear. This support $h$ is provided with a screw-thread on its outside or peripheral edge, which fits a corresponding thread within the truncated end of the filtering-receptacle B, by which construction the circular supports $h$, with their strainers, may be removed simultaneously with facility from the filtering-receptacle, and the necessity of employing solder or other permanent fastening is thus avoided.

The case or filtering-receptacle B resembles, in general appearance, a sphere flattened at its poles, and with a deep annular groove, $k$, formed centrally in its outer surface—*i. e.*, in a plane at right angles to the plane passing through the centers of the strainers—this groove avoiding the necessity of a passage through the receptacle for the water without being filtered. At right angles to and extending across this groove $k$ is a rectangular channel, $l$, within which loosely fits a rectangular projection, $m$, on the inner end of a stem, $n$, which passes through a circular opening in the outer casing, A, the outer end of said stem being provided with a cross-bar, which serves as a handle, C, by operating which the receptacle B is made to rotate a half-revolution in order to reverse the position of the strainers

*g* when it is desired to cleanse them, the loose attachment of the stem to the receptacle B allowing it to fall by its gravity upon the seat *f*, which it snugly fits, thereby preventing the passage of water between them.

The stem is automatically packed in the following manner: The opening through the outer casing, A, for the passage of the stem is provided with two segmental shoulders, *p q*, and two annular shoulders, *r s*. Against or upon the shoulder *r* is fitted a packing-ring, *t*, for the shoulder *s* of the stem to bear against.

The inner end of the stem, just outside the projection *m*, is provided with a disk or circular enlargement, *u*, Fig. 6, of a diameter corresponding exactly to the inner end of the opening in the outer casing, A, and abutting against the segmental shoulder *p*. A water-tight joint between these surfaces is reliably insured at all times by the resistance of a coiled spring, *v*, surrounding the outer end of the stem and bearing against the outer shoulder, *s*, and inner end of the handle C, the pressure of the water when the filter is in use assisting the spring to keep the disk *u* pressed snugly against the shoulder *p*.

The shoulder *q* performs the office of a stop, against the sides of which a projection, *w*, on the stem comes in contact to limit the rotation of the filtering-receptacle B exactly to one-half a revolution, the centers of the two strainers and the centers of the inlet and outlet passages of the outer casing lying in one and the same vertical line when the filter is in a position for the flow of the water through it, in which position the handle C is horizontal.

When a supply of water is wanted without delay, and it is not required to be filtered, it is simply necessary to rotate the filtering-receptacle B one-quarter of a circle (ninety degrees) by turning the handle into a vertical position, when the water will flow down the central groove *k* and around the truncated sides of the filtering-receptacle into the chamber *x*, between it and the outer casing, A, and out through the discharge-orifice *d*, the sediment being at the same time washed from the outside of the strainers *g*.

By frequently turning the filtering-receptacle B when in use, so as to reverse the position of its strainers, any impurities which lodge on the upper strainer will be instantly removed by the flow of the water through the filtering-receptacle when said upper strainer has been turned to occupy the position of a lower one.

Instead of the groove *k*, formed within the outer surface of the receptacle B, the corresponding surface may be cut away or flattened, so as to present the appearance of a flat band encircling it, which would also form a central passage for the water around it and through the discharge-orifice *d*.

The rectangular channel *l*, cut into the shell of the receptacle B for the reception of the inner end of the stem *n*, I prefer to such channel formed by and between two projections on its outer surface, as shown and described in the Letters Patent of the United States herein referred to.

I claim—

1. A filtering-receptacle, B, grooved or flattened on its outer surface for the passage of the water when not required to be filtered, and with a suitable device for rotating the same, in combination with an outer casing, A, having an inlet and outlet, substantially as described.

2. A support, *h*, with arms *j*, in combination with a strainer, *g*, and a filtering-receptacle, B, as and for the purpose set forth.

3. A circular wire spring, *i*, a support, *h*, and a strainer, *g*, in combination with a filtering-receptacle, B, the strainer being held in place by said spring, substantially as specified.

4. The stem *n*, with its projections *m* and *w*, disk *u*, spring *v*, and handle C, in combination with a filtering-receptacle having a channel, *l*, and an outer casing, A, having an opening for the reception of the stem *n*, said opening being provided with a stop, *q*, and suitable shoulders for the stem to abut against, constructed to operate as and for the purpose explained.

Witness my hand this 14th day of October, 1880.

JAMES A. CROCKER.

In presence of—
N. W. STEARNS,
L. LITCHFIELD.